United States Patent Office 3,686,244
Patented Aug. 22, 1972

3,686,244
METAL COMPLEXES OF DITHIOBIURETS
Alfred F. Marks, Trenton, N.J., assignor to Esso
Research and Engineering Company
No Drawing. Filed Apr. 27, 1970, Ser. No. 32,337
Int. Cl. C07f 15/02, 15/04, 15/06
U.S. Cl. 260—439 R       5 Claims

ABSTRACT OF THE DISCLOSURE

Metal complexes of dithiobiurets have been found to exhibit effective fungicidal and growth regulating activity. Exemplary of such compounds are those represented by the following structure:

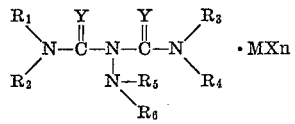

wherein $R_1$–$R_6$ are each selected from a group consisting of hydrogen, $C_1$–$C_{10}$ alkyl, $C_2$–$C_{10}$ alkenyl, $C_3$–$C_{10}$ cycloalkyl optionally substituted with $C_1$–$C_6$ alkyl chloro, bromo, $C_6$–$C_{10}$ aryl, optionally substituted with $C_1$–$C_6$ alkyl, chloro, bromo, $C_7$–$C_{10}$ arylalkyl, $C_7$–$C_{10}$ alkaryl.

$R_1$ and $R_6$ and/or $R_3$ and $R_4$ and/or $R_5$ and $R_6$ together can be a carbocyclic ring containing one or more heteroatoms such as N or S; M is one selected from the group consisting of zinc, iron, nickel, copper, manganese and cobalt; X is an anion being one selected from the group consisting of chloride, bromide, iodide, sulfate, nitrate, phosphate and acetate; $n$ is an integer determined by the valence of the metal atoms, and Y is either O or S.

---

This invention relates to the use of metal complexes of dithiobiurets as growth regulants and fungicides.

In one aspect this invention relates to the use of the aforesaid compounds as fruit-thinning agents. In another aspect, this invention relates to the use of the aforesaid compounds as plant growth regulants. In yet another aspect, this invention relates to the use of the aforesaid compounds as crop harvest aids. In another aspect, this invention relates to the use of the aforesaid compounds as fungicides.

The broad class of growth regulants are those compounds having an ability to regulate vegetative, flowering and fruiting characteristics of crops produced throughout the world. With growth regulators, it is now possible to chemically control and alter the physiological processes in the growing crop, which up until the advent of such technology could only be triggered by natural and climatic conditions. Thus, it is possible to produce crops of higher quality and with greater flexibility in harvesting procedures. Various theories have been proposed for explaining the mechanisms of chemical growth regulants such as, they prevent fertilization of freshly-opened flowers by inducing an incompatible condition between the stylar tissue and the pollen tubes. Another theory is that a crop is thinned because of an increased drop in young fruitlets due to accelerated ethylene generation by the particular treatment. Developing fruitlets on weak spurs with a limited food supply may be more susceptible than those with an abundant supply so that the elimination of clusters where two or more fruits have set on the same spur can be explained on the basis of competition for food; that is, the fruitlets having the greatest advantage for food supply possess the most resistance to the chemical treatment.

Whatever may be the actual mechanism involved in chemical fruit thinning or in the removal of unwanted growth for particular plants, or in the abscission of the fruit when the plant matures, thereby regulating the harvest season, the growth regulants have indeed opened up an entirely new field for agricultural chemicals.

An object of the present invention is to provide a process for thinning fruit plants, such as citrus, stone and pome fruits, small fruits and nuts, in which a chemical material may be employed within a relatively narrow range of concentrations without danger of either over-thinning, or causing foilage and fruit damage. Another object of the invention is to provide a process of thinning fruits with a chemical agent which can effectively be applied to the trees over a relatively long period of time beginning with full bloom.

Yet another object of the invention is to provide a process for adjusting the rate and timing of abscission of undesirable late flowers and fruitlets prior to mechanical harvesting of mature crops.

A still further object of the invention is to provide a process for controlling the rate of final development and maturation of crops so as to regulate the timed abscission of the mature fruit, vegetables, nuts or berries.

A still further object of the invention is to provide a process for delaying the onset of normal maturation processes, such as, senescence or defoliation, thereby providing continued vegetative growth, as well as more intensely colored foilage.

A still further object of the invention is to prevent the photodegradation of dithiobiurets without in any way impairing its growth regulating or fungicidal activity.

Other objects and many of the attended advantages of this invention will be readily appreciated as the same becomes better understood by reference to the following detailed description.

Briefly, this invention relates to a method for regulating the growth of plants, said method comprising the step of treating growing plants with a material of the group consisting of those compounds represented by one of the following formulae:

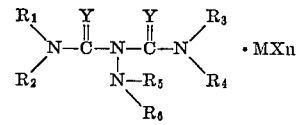

wherein $R_1$–$R_6$ are each selected from a group consisting of hydrogen, $C_1$–$C_{10}$ alkyl, $C_2$–$C_{10}$ alkenyl, $C_3$–$C_{10}$ cycloalkyl optionally substituted with $C_1$–$C_6$ alkyl chloro, bromo, $C_6$–$C_{10}$ aryl, optionally substituted with $C_1$–$C_6$ alkyl, chloro, bromo, $C_7$–$C_{10}$ arylalkyl, $C_7$–$C_{10}$ alkaryl.

$R_1$ and $R_6$ and/or $R_3$ and $R_4$ and/or $R_5$ and $R_6$ together can be a carbocyclic ring containing one or more heteroatoms such as N or S; M is one selected from the group consisting of zinc, iron, nickel, copper, manganese and cobalt; X is an anion being one selected from the group consisting of chloride, bromide, iodide, sulfate, nitrate, phosphate and acetate; $n$ is an integer determined by the valence of the metal atoms, and Y is either O or S.

Specific examples of compounds having the above structure are listed hereinbelow:

| Compound No. | |
|---|---|
| 1 | Ferric chloride adduct of 1,1,5,5-tetramethyl-3-dimethylaminodithiobiuret. |
| 2 | Zinc chloride adduct of 1,1,5,5-tetramethyl-3-pentamethyleneaminodithiobiuret. |
| 3 | Ferric iodide adduct of 1,1,5,5-tetramethyl-3-diethylaminodithiobiuret. |
| 4 | Ferric sulfate adduct of 1,1,5,5-tetramethyl-3-diethylaminodithiobiuret. |
| 5 | Ferric nitrate adduct of 1,1-dimethyl-3-dimethylamino-5,5-diethyldithiobiuret. |
| 6 | Ferric chloride adduct of 1,1,5,5-tetraethyl-3-pentamethyleneaminodithiobiuret. |

| Compound No. | |
|---|---|
| 7 | Cupric chloride adduct of 1,1,5,5-tetraethyl-3-hexamethyleneaminodithiobiuret. |
| 8 | Nickel chloride adduct of 1,1,5,5-tetramethyl-3-hexamethyleneaminodithiobiuret. |
| 9 | Cobaltous chloride adduct of 1,1,5,5-tetramethyl-3-carbethoxyaminodithiobiuret. |
| 10 | Manganous chloride adduct of 1,1,5,5-tetramethyl-3-di-n-propylaminodithiobiuret. |
| 11 | Ferric bromide adduct of 1,1,5,5-tetraethyl-3-diethylaminodithiobiuret. |
| 12 | Ferric chloride adduct of 1,1-dimethyl-3-dimethylamino-5,5-di-n-propyl-dithiobiuret. |
| 13 | Ferric chloride adduct of 1,1,5,5-tetramethyl-3-(N-methyl dodecylamino)dithiobiuret. |
| 14 | Ferric chloride adduct of 1,1-dimethyl-3-dimethylamino-5,5-di-n-hexyldithiobiuret. |
| 15 | Ferric chloride adduct of 1,1-dimethyl-3-dimethylamino-5,5-pentamethylenedithiobiuret. |
| 16 | Ferric chloride adduct of 1,1,5,5-tetramethyl-3-(N-methyl anilino)dithiobiuret. |
| 17 | Ferric chloride adduct of 1,1,5-trimethyl-3-dimethylamino-5-n-dodecyldithiobiuret. |
| 18 | Ferric chloride adduct of 1,1-dimethyl-3-dimethylamino-5,5-(3-oxotetramethylene)dithiobiuret. |
| 19 | Ferric chloride adduct of 1,1,5,5-di(3-oxotetramethylene) dimethylaminodithiobiuret. |
| 20 | Ferric chloride adduct of 1,1-pentamethylene-3-dimethylamino-5,5-(3-oxotetramethylene)dithiobiuret. |
| 21 | Ferric chloride adduct of 1,1,5,5-di(pentamethylene)-3-dimethylaminodithiobiuret. |
| 22 | Ferric chloride adduct of 1,1,5-trimethyl-3-dimethyl-amino-5-phenyldithiobiuret. |
| 23 | Ferric chloride adduct of 1-methyl-1-phenyl-3-dimethyl-amino-5-ethyl-5-cyclohexyl-dithiobiuret. |
| 24 | Ferric chloride adduct of 1,1-dimethyl-3-dimethylamino-5-ethyl-5-phenyl dithiobiuret. |
| 25 | Ferric chloride adduct of 1,1-dimethyl-3-dimethylamino-5-methyl-5-(4-chlorophenyl)dithiobiuret. |
| 26 | Ferric chloride adduct of 1,1-dimethyl-3-dimethylamino-5-methyl-5-(4-methylphenyl)dithiobiuret. |
| 27 | Ferric chloride adduct of 1,1-dimethyl-3-dimethylamino-5-methyl-5(4-methylthiophenyl)dithiobiuret. |
| 28 | Ferric chloride adduct of 1,5-dimethyl-1,5-diphenyl-3-dimethylaminodithiobiuret. |
| 29 | Ferric chloride adduct of 1,1,5-trimethyl-3-dimethylamino-5-benzyldithiobiuret. |
| 30 | Ferric chloride adduct of 1,1,5-trimethyl-3-hexamethylene-amino-5-phenyldithiobiuret. |
| 31 | Ferric chloride adduct of 1,1,5-trimethyl-3-pentamethylene-amino-5-phenyldithiobiuret. |
| 32 | Ferric chloride adduct of 1,1,5,5-tetramethyl-3[N-methyl(6]chloropyridyl)amino]dithiobiuret. |
| 33 | Ferric chloride adduct of 1,1-dimethyl-3-dimethylamino-5-n-propyl-5-phenyldithiobiuret. |
| 34 | Ferric chloride adduct of 1,1-1(N-methyl)-3-aminotetra] methylene]-3-dimethylamino-5-methyl-5-phenyldithiobiuret. |
| 35 | Ferric chloride adduct of 1,5-dimethyl-1,5-diphenyl-3-N-methylanilino dithiobiuret. |
| 36 | Ferric chloride adduct of 1,1-dimethyl-3-dimethylamino-5,5-di(cyanomethyl)dithiobiuret. |
| 37 | Ferric chloride adduct of 1,1-dimethyl-3-dimethylamino-5-phenyl-5-carboethoxymethylenedithiobiuret. |
| 38 | Ferric chloride adduct of 1,1-dimethyl-3-dimethylamino-5-methyl-5-furfuryldithiobiuret. |
| 39 | Ferric chloride adduct of 1,1-dimethyl-3-dimethylamino-5-phenyl-5-benzyldithiobiuret. |
| 40 | Ferric chloride adduct of 1,1,5-trimethyl-3-dimethylamino-5-(2-picolyl)dithiobiuret. |
| 41 | Ferric chloride adduct of 1,1,5-trimethyl-3-dimethyl-amino-5-tetrahydrofurfuryldithiobiuret. |
| 42 | Ferric chloride adduct of 1,1-dimethyl-3-dimethylamino-5-phenyl-5-N-acetamidodithiobiuret. |

The dithiobiurets which are the starting materials for forming the metal complexes of the subject invention are described in a copending case, Ser. No. 821,975 which was filed on May 5, 1969, now abandoned, in the name of James Zielinski and entitled "Semicarbazide and Biuret Derivatives and Their Uses as Agricultural Pesticides and Animal Health Agents."

The metal complexes can be prepared according to the following reaction:

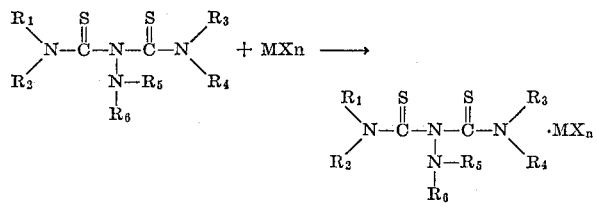

wherein $R_1$–$R_6$, $MX_n$ are defined as hereinabove. This reaction can be carried out under a temperature ranging from $-10°$ C. to $250°$ C., preferably $10°$ C. to $30°$ C. in the presence of solvents such as acetone, dimethyl formamide, tetrahydrofuran, ethanol, methanol, propanol and water. Preferred solvent is acetone. The mole ratio of the dithiobiuret to the halide ranges from 1:3 to 3:1 and preferably in the range of equal molar ratios of 1:1. The reaction can be run under atmospheric pressure. The concentration of the reactants in the solvent is of no consequence.

The compounds may be applied to the plants in a number of ways any time throughout the growing season depedning on the type of effect desired. When used the metal complexes of the dithiobiurets are preferably formulated with a suitable inert carrier or diluent thereof.

The term "carrier" or "diluent" as used herein means a material, which can be inorganic or organic and synthetic or of natural origin, with which the active metal complexes of the dithiobiurets are mixed or formulated to facilitate its storage, transport, and handling and application of the plants or fungi to be treated. The carrier is preferably biologically and chemically inert, and as used, can be a solid or fluid. When solid carriers are used, they are preferably particulate; however, other shapes and sizes of solid carrier can be employed as well. Such preferably solid carriers can be natural occurring minerals, although subsequently subjected to grinding, sieving, purification, and/or other treatments, including for example, gypsum; tripolite diatomaceous earth; mineralsilicates such as mica, vermiculite, talc and pyrophyllite, clays of the montmorillonite, kaolinite, or attapulgite groups; calcium or magnesium limes, or calciate and dolomite; etc. Carriers produced synthetically, as for example, synthetic hydrated silica oxides and synthetic calcium silicates can also be used, and many proprietary products of this type are available commercially. The carrier can also be an elemental substance such as sulfur or carbon, preferably an activated carbon.

Fluid carriers can be liquids, as for example, water, or an organic fluid, including a liquefied normally vaporous or gaseous material, or a vaporous or gaseous material, and can be solvents or nonsolvents for the active material. For example, the horticultural petroleum spray oils boiling in the range of from about 275° F. to about 575° F., or boiling in the range of about 575° F. to about 1,000° F. and having an unsulfonatable residue of at least about 75% and preferably of at least about 90%, or mixtures of these two types of oil, are particularly suitable liquid carriers.

The carrier can be mixed or formulated with the active material during its manufacture or at any stage subsequently. The carrier can be mixed or formulated with the active material in any proportion depending on the nature of the carrier. One or more carriers, moreover, can be used in combination.

The compositions of this invention can be concentrates, suitable for storage or transport and containing, for example, from about 5 to about 90% by weight of the active dithiobiuret metal complexes, preferably from about 20 to about 80 wt. percent. These concentrates can be diluted with the same or different carrier to a concentration suitable for application. The compositions of this invention may also be dilute compositions suitable for application. In general, concentrations of about 0.1 to about 10% by weight, of active material based on the total weight of the composition are satisfactory, although lower and higher concentrations can be applied if necessary.

The compositions of this invention can also be formulated as dusts. These comprise an intimate admixture of the active dithiobiuret metal complex and a finely powdered solid carrier such as aforedescribed. The powdered carriers can be oil-treated to improve adhesion to the surface to which they are applied. These dusts can be concentrates, in which case a highly sorptive carrier is preferably used. These require dilution with the same or a different finely powdered carrier, which can be of lower sorptive capacity, to a concentration suitable for application.

The compositions of the invention can be formulated as wettable powders comprising a major proportion of the dithiobiuret metal complex mixed with a dispersing, i.e., deflocculating or suspending agent, and, if desired, a finely divided solid carrier and/or a wetting agent. The dithiobiuret metal complex can be in particulate form or absorbed on the carrier and preferably constitute at least about 10%, more preferably at least about 25%, by weight of the composition. The concentration of the dispersing agent should in general be between about 0.5 and about 5% by weight of the total composition, although larger or smaller amounts can be used if desired.

The dispersing agent used in the composition of this invention can be any substance having definite dispersing, i.e., deflocculating or suspending properties, as distinct from wetting properties, although these substances can also possess wetting properties as well.

The dispersant or dispersing agent used can be protective colloids such as gelatin, glue, casein, gums, or a synthetic polymeric material such as polyvinyl alcohol and methyl cellulose. Preferably, however, the dispersants or dispersing agents used are sodium or calcium salts of high molecular weight sulfonic acids, as for example, the sodium or calcium salts of lignin sulfonic acids derived from sulfite cellulose waste liquors. The calcium or sodium salts of condensed aryl sulfonic acid, for example, the products known as "Tamol 731" are also suitable.

The wetting agents used can be nonionic type surfactants, as for example, the condensation products of fatty acids containing at least 12, preferably 16 to 20, carbon atoms in the molecule, or abietic acid or naphthenic acid obtained in the refining of petroleum lubricating oil fractions with alkylene oxides such as ethylene oxide or propylene oxide, or with both ethylene oxide and propylene oxide, as for example, the condensation product of oleic acid and ethylene oxide containing about 6 to 15 ethylene oxide units in the molecule. Other nonionic wetting agents like polyalkylene oxide polymers, commercially known as "Pluronics" can be used. Partial esters of the above acids with polyhydric alcohols such as glycerol, polyglycerol, sorbitol, or mannitol can also be used.

Suitable anionic wetting agents include the alkali metal salts, preferably sodium salts, of sulfuric acid esters or sulfonic acids containing at least 10 carbon atoms in a molecule, for example, the sodium secondary alkyl sulfates, dialkyl sodium sulfosuccinate available under the registered trademark "Teepol," sodium salts of sulfonated castor oil, sodium dodecyl benzene sulfonate.

The final wettable powder should preferably have an average particle size of 5–10μ.

Where the toxicant itself is a liquid, these materials can be sprayed on crops or fungi without further dilution. Petroleum hydrocarbon fractions used as solvents should preferably have a flash point above 73° F., an example of this being a refined aromatic extract of kerosene. Auxiliary solvents such as alcohols, ketones, and polyalkylene glycol ethers and esters can be used in conjunction with these petroleum solvents.

The treatment rates range from .1 to 3 lbs./acre of the active ingredients with a preferred range of .1 to ⅓ lbs./acre. The materials are applied at optimum timing so as to have the desired effect on the particular crop. Therefore, applications may be made once or more than once depending on plant species or varieties, cultural conditions, environmental conditions for the particular type of effect desired.

In addition to defining activity as growth regulants, the subject metal complexes also possess fungicidal activity. In order to demonstrate the effectiveness of these compounds as growth regulants and as fungicides, the following examples are hereinafter presented.

EXAMPLE 1

In order to demonstrate the fungicidal activity of these compounds of the subject invention, aqueous solutions of the active compounds were prepared by mixing the active ingredients with varying amounts of acetone as an auxiliary solvent, adding thereto 100 parts per million by weight of a commercial wetting agent consisting of Triton X 100 and diluting this premixture with water to the desired concentration indicated in the table hereinbelow. Triton X 100 is one of a line of commercial surfactants produced by Rohm and Haas Company and is a liquid alkyl aryl polyether alcohol that is an acid stable detergent and is nonionic in character as an emulsifier. It is prepared by reaction of an alkylphenol with ethylene oxide.

The spray solution containing the active fungicide was applied as a protectant spray to tomato plants. After the deposit had dried, Phytophthora Infestans spores were applied. Disease ratings were taken in 7–10 days. The results are shown in Table I.

TABLE I.—FUNGICIDAL ACTIVITY

[Late blight activity of metal complexes]

| Rates, p.p.m. (acetone-water solution) | Percent control ferric chloride adduct of 1,1,5,5-tetramethyl 3-dimethylamino-dithiobiuret | Percent control zinc chloride adduct of 1,1,5,5-tetramethyl 3-dimethylamino-dithiobiuret |
| --- | --- | --- |
| 500 | 100 | 100 |
| 100 | 100 | 90 |
| 20 | 80 | 80 |
| 4 | 60 | 70 |
| 1 | 40 | 50 |

EXAMPLE 2

0.1 grams of a 1% suspension of the ferric chloride adduct of 1,1,5,5-tetramethyl-3-dimethylaminodithiobiuret in lanolin were placed around the lower stem of each of two Deltapine cotton plants.

The abscission of the previously lowest petiole on each plant was determined seven days following treatment by application of a 5 gram pressure to the outer portion of the petiole. The treated plants exhibit accelerated petiole abscission as shown by the following data for each replica.

TABLE II

| Compound | Days to cotton petiole abscission | 7 day growth regulants effect on bean seedlings |
| --- | --- | --- |
| Treatment, lanolin only, control | 6 | No effect. |
| Ferric chloride adduct of 1,1,5,5-tetramethyl 3-dimethylamino-dithiobiuret. | 2 | New growth abscissed. |

In the stability test procedure the dithiobiuret ingredient is deposited on a piezoelectric quartz crystal which functions as a sensitive microbalance. When electrically excited, the high frequency vibrations of the quartz plates are inversely proportional to the mass of the material present on the plate, whereby the change in frequency is calibrated as a rate of loss in weight due to decomposition of the dithiobiuret ingredient. Then change in weight is noted in grams per minute per cm.$^2$ as a function of the exposure to an ultraviolet light source when compared with the visible light containing no ultraviolet ingredient. The results of the stability test are given in Example 3.

In order to compare the U.V. stability of the starting dithiobiurets with the metal complexed dithiobiurets the following evaluation was conducted:

EXAMPLE 3

[Effect of metal complexing of dithiobiurets on maintaining their stability against U.V. exposure]

| Sample | Volatility rate at 80° F., gms./min./cm.² | |
|---|---|---|
| | Visible light only | U.V. exposure |
| 1,1,5,5-tetramethyl-3-dimethylaminodithiobiuret. | Nil | 7.6×10⁻⁷. |
| Ferric chloride adduct of 1,1,5,5-tetramethyl-3-dimethylaminodithiobiuret. | Nil | Nil. |
| Zinc chloride adduct of 1,1,5,5-tetramethyl-3-dimethylaminodithiobiuret. | Nil | Nil. |

This example definitely shows that metal complexing of the dithiobiurets does provide the resulting complex with stability towards U.V. degradation to which the parent compound demonstrates instability.

In summary, the unique properties of these compounds are useful as abscission-control agents to adjust the rate and timing of abscission of flowers, fruits, (including citrus stone, pome fruits), nuts, berries, floral and vegetable crops; as mature crop harvest aids applied to later stages of the maturing crop to control the rate of final development and maturation of the crop and regulate the timed abscission of the mature fruit, vegetables, nuts or berries; as foliar maturation control agents applied to forage, turf, horticultural and ornamental plants or crops to delay the onset of normal maturation processes such as senescence or defoliation thereby providing continued vegetative growth and/or more intensely colored foliage so as to provide higher yields of forage crops and more desirable foliage on other plants and turfs; as crop-pruning agents applied to cucurbits and other vine crops and indeterminate vegetables several days or weeks prior to harvesting to stimulate abscission of young fruit and flowers, leaving only the earlier setting or maturing fruit for subsequent harvest during a concentrated time period; as plant sex expression modifiers applied to cucurbits to increase the ratio of female to male flowers thereby increasing subsequent crop yields; as a preventative of sucker shoots from growing on tobacco plants thereby stepping up the prime leaf yield so as to reduce the grower's costs; as a preventative of wrinkling and shrinking or softening of fresh vegetables when stored or shipped; as a preventative of the sprouting of onions and potatoes when in storage.

The plant growth regulants mentioned hereinabove, although safe to handle, and operative under very favorable conditions over a longer period of application time, nevertheless must be employed within a relatively narrow limit of concentration or else overthinning, epinasty, and other serious damage to foliage and shoots will occur.

What is claimed is:
1. A compound of the formula

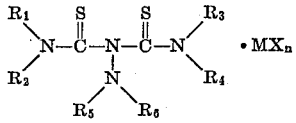

wherein each of $R_1$, $R_2$, $R_3$, $R_4$, $R_5$ and $R_6$ is $C_1$–$C_{10}$ alkyl; M is a metal selected from the group consisting of iron, cobalt and nickel; and X is an anion selected from the group consisting of chloride, bromide, iodide, sulfate, nitrate, phosphate and acetate; and $n$ is an integer determined by the valence of the metal atom.

2. A compound according to claim 1 which is the ferric chloride adduct of 1,1,5,5-tetramethyl-3-dimethylaminodithiobiuret.

3. A compound according to claim 1 which is the ferric iodide adduct of 1,1,5,5-tetraethyl-3-diethylaminodithiobiuret.

4. A compound according to claim 1 which is ferric chloride adduct of 1,1-dimethyl-3-dimethylamino-5,5-di-n-propyl dithiobiuret.

5. A compound according to claim 1 which is ferric chloride adduct of 1,1-dimethyl-3-dimethylamino-5,5-di-n-hexyldithiobiuret.

References Cited

FOREIGN PATENTS 1,015,136    7/1952    France.

OTHER REFERENCES

Usatenko et al. Chem. Abst. 1964, columns 12641–2.

TOBIAS E. LEVOW, Primary Examiner

A. P. DEMERS, Assistant Examiner

U.S. Cl. X.R.

71—94, 95, 97; 260—242, 270 R, 326.82 R, 429 R, 429.9, 438.1, 552 R, 553 B, 554; 424—267, 274, 287, 289, 294, 295